United States Patent [19]

Gibb

[11] Patent Number: 4,819,966

[45] Date of Patent: Apr. 11, 1989

[54] SEALING MEANS FOR A MULTIPATH, MULTIPASS SWIVEL

[75] Inventor: Peter R. Gibb, Port Coquitlam, Canada

[73] Assignee: Canocean Engineering Ltd., Canada

[21] Appl. No.: 119,242

[22] Filed: Nov. 6, 1987

Related U.S. Application Data

[63] Continuation of Ser. No. 867,693, May 28, 1986, abandoned.

[30] Foreign Application Priority Data

May 28, 1985 [CA] Canada ................................ 482512

[51] Int. Cl.⁴ .......................................... F16L 17/00
[52] U.S. Cl. ..................................... 285/18; 285/106; 285/110; 285/136; 285/190
[58] Field of Search ............... 285/106, 136, 190, 110, 285/18

[56] References Cited

U.S. PATENT DOCUMENTS

| | | | |
|---|---|---|---|
| 1,859,065 | 5/1932 | Anderson | 285/106 X |
| 2,083,970 | 6/1937 | Walter . | |
| 2,325,464 | 7/1943 | Bannister | 285/190 |
| 2,835,514 | 5/1958 | McGahan . | |
| 2,877,026 | 3/1959 | Payne et al. . | |
| 2,943,868 | 7/1960 | Hanback . | |
| 3,098,662 | 7/1963 | Iversen | 285/190 X |
| 3,114,566 | 12/1963 | Coberly et al. | 285/18 X |
| 3,145,035 | 8/1964 | Hanback | 285/190 X |
| 3,290,065 | 12/1966 | Porath | 285/94 |
| 3,533,635 | 10/1970 | Godin et al. . | |
| 3,887,199 | 6/1975 | Sundqvist . | |
| 3,923,324 | 12/1975 | Cruickshank et al. | 285/18 X |
| 4,126,336 | 11/1978 | Ortloff et al. | 285/136 |
| 4,311,327 | 1/1982 | Ortloff et al. . | |
| 4,337,970 | 7/1982 | Gunderson . | |
| 4,405,162 | 9/1983 | Williams | 285/190 X |
| 4,408,765 | 10/1983 | Adelmann, Jr. . | |
| 4,418,947 | 12/1983 | Talafuse . | |
| 4,447,062 | 5/1984 | Leicht . | |
| 4,451,046 | 5/1984 | Bliven . | |
| 4,482,159 | 11/1984 | Ishitani et al. . | |
| 4,520,879 | 6/1985 | MacElvain | 285/190 X |
| 4,561,679 | 12/1985 | Choate | 285/190 x |
| 4,602,806 | 7/1986 | Saliger | 285/41 |
| 4,669,758 | 6/1987 | Feller et al. | 285/136 X |

FOREIGN PATENT DOCUMENTS

| | | | |
|---|---|---|---|
| 291361 | 7/1929 | Canada . | |
| 650852 | 10/1962 | Canada . | |
| 719487 | 10/1965 | Canada . | |
| 745053 | 10/1966 | Canada | 285/136 |
| 792136 | 8/1968 | Canada . | |
| 828626 | 12/1969 | Canada . | |
| 848783 | 9/1952 | Fed. Rep. of Germany | 285/190 |
| 2716724 | 10/1967 | Fed. Rep. of Germany | 285/136 |
| 524950 | 8/1976 | U.S.S.R. | 285/136 |
| 2132726 | 7/1984 | United Kingdom . | |

OTHER PUBLICATIONS

Journal of Engineering for Industry, Application of Primary Sealing Criteria to a Self Energized Gasket, pp. 553–562, Aug. 1979.

Primary Examiner—Thomas F. Callaghan
Attorney, Agent, or Firm—Stevens, Davis, Miller & Mosher

[57] ABSTRACT

A means of sealing a multipath, multipass swivel whereby that part of the structure housing the seal element deflects under pressure to compensate for the overall structural deflections, such that a constant seal gap is maintained. A means of lubricating and flushing seal surfaces is also disclosed whereby a controlled liquid is injected between two seals at a higher pressure than the production fluid such that the seal between the injected liquid and the production fluid is less capable than the seal between the controlled liquid and ambient.

13 Claims, 7 Drawing Sheets

SEALING MEANS FOR A MULTIPATH, MULTIPASS SWIVEL

This application is a continuation of application Ser. No. 867,693, filed May 28, 1986, and now abandoned.

The invention relates to a sealing means for a multipath, multipass swivel.

BACKGROUND

When offshore oil and gas wells are drilled and completed subsea, the production can flow through flow lines to either a pipline to shore, or to a nearby fixed structure, or to a floating production facility. For floating production facilities, it is usually feasible to run all the individual flow lines to the surface. If the floating production facility is a ship-shaped vessel, it is usually moored by a single-point mooring arrangement, whereby the vessel can weathervane around the mooring point. This enables the vessel to head into the waves and wind, and reduce the mooring loads. As a consequence, it is possible for the vessel to continuously rotate in the same direction around the mooring point. With more than one production flow line passing through the mooring point, it is necessary to have some form of swivel. Thus, the swivel must be capable of having many flow paths through it and the complete assembly must be able to make multi passes as it rotates. Usually, this is accomplished by having all the flow paths bundled together in a central core or shaft, and then having each path individually exit sideways into an annular ring that rotates around the core. Swivels like this already exist, but for relatively low pressures and for liquids.

To date, there are not very many floating production systems, and usually they are on small, low-pressure oil fields. The associated gas is often used for power generation and the surplus flared, i.e. wasted. In future, it is expected that floating production systems will be used on high-pressure fields (up to 10,000 psi) and that government regulations will not permit the flaring of gas. One option is to reinject the associated gas back into the reservoir, which means pressurizing the gas to a higher pressure than the reservoir. Thus there is a need for a high-pressure, multipass swivel that can handle gas as well as oil.

The critical area of a swivel is the sealing system. The higher the pressure, the more difficulty in maintaining a seal, and gas is even more difficult. The present invention addresses the problem of sealing.

The traditional method of sealing swivels is to use an elastomer or plastic material for the seal element, often with reinforcing. There are many shapes and configurations of the seal itself. One important criteria is the seal gap—the distance between the two parts being sealed. The larger the gap or the higher the pressure, the more the possibility of the seal being extruded into the gap. In general, the larger the gap, the larger the seal must be, and the material must be harder or stronger. As the seal size increases, so does the frictional resistance, which can be a significant problem with multipass swivels. Although it is possible to make a swivel with an extremely small seal gap, the gap will not be maintained as the assembly is pressurized with production fluid. The annular ring of the swivel will expand under pressure and the seal gap will increase. Adding more material to the annular ring will help the problem but it becomes impractical before satisfactory gap control is reached.

The present invention provides an alternative means of controlling the seal gap. It uses the deflections of the outer (annular) ring in a way that compensates for radial expansion.

SUMMARY OF THE INVENTION

According to a first feature of the present invention, there is provided a means for sealing a multipath, multipass swivel whereby the part of the structure housing the seal element deflects under pressure to compensate for the overall structural deflections such that a constant seal gap is maintained.

More specifically the invention provides a fluid swivel including a central cylinder member having a bore and an essentially radially outwardly opening exit port and, surrounding the cylindrical member, an annular ring having an annular groove adapted to register with the port, and communicating with an outlet port on the exterior of the ring, whereby the cylindrical radially inner surfaces to each side of the groove are sealed against the exterior cylindrical surface of the cylinder member by at least two axially spaced apart seals, and including means for introducing a fluid under pressure between the two seals at a higher pressure than the fluid in the bore, the two seals being such that in such conditions, the fluid introduced between the seals passes more easily across the seal to the annular groove than across the other of the two seals.

Such a swivel is preferably one in which the groove is surrounded by a chamber of axial dimensions substantially larger than the width of the groove, the wall thickness between the chamber and the inner cylindrical surface of the annular ring being sufficiently thin that increasing the pressure in the fluid within the chamber urges the lips of the groove more strongly against the outside of the central cylindrical member despite the overall expansion of the annular ring caused by the increase in pressure.

Thus the invention provides generally a means for lubricating and flushing seal surfaces, whereby a controlled liquid is injected between two seals at a higher pressure than the production fluid such that the seal between the injected liquid and the production fluid is less capable than the seal between the controlled liquid and ambient.

BRIEF DESCRIPTION OF THE DRAWINGS

The invention is illustrated by way of example in the accompanying drawings in which:

FIG. 7 is an enlargement of a portion of FIG. 6.

DETAIL DESCRIPTION

Figure 1:
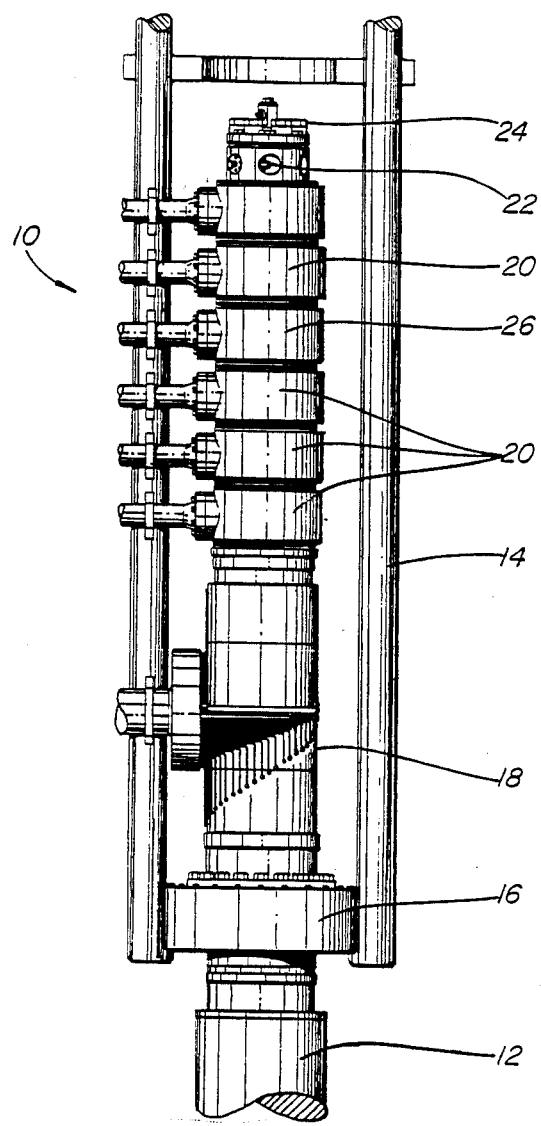
FIG. 1 is an elevation view of a multipass swivel.

FIG. 1 shows an overall view of a multipass assembly swivel 10. At the base is a connector 12 for attaching the assembly 10 to the top of the multiple flow paths which, in this case, is called a riser. A riser is the pipe or pipes that connect the equipment on the seabed with the surface vessel. Usually, the riser is tensioned in order to withstand the environmental loading. The riser tensioning support 14 carries the riser tension loads around the swivel 10. A thrust bearing 16 connects the support 14 to the riser connector 12 so that the two can rotate axially relative to each other. All the small hydraulic control lines (required for controlling the subsea equipment) exit at the base of the swivel assembly 10 through the control line swivel 18. Above this are the production swivels 20. Each production bore goes all the way to the top of the assembly, where shut-off valves 22 are located. Thus, if "Through Flowline Tools" need to be put into the flow lines, they can be entered at the top by removing the TFL access caps 24 and installing a lubricator. In this way, tools do not need to pass through the swivel rings. Although each production bore goes to the top of the swivel, a side exit off each bore allows the production fluid to pass through the annular outer ring 26 of the swivel 20. The outer ring 26 is attached to the riser tensioning support 14. Thus the outer ring 26 and the riser tensioning support 14 move together and can rotate axially relative to the centre shaft.

Figure 2:
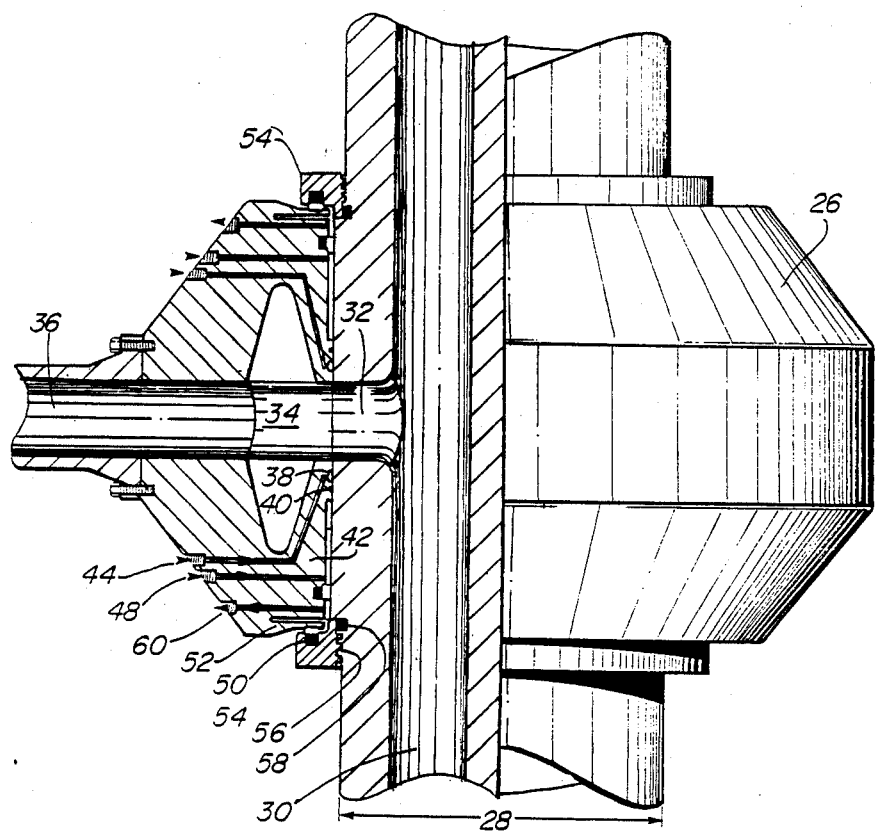
FIG. 2 is a cross-sectional view of one swivel.

FIG. 2 shows a cross section through one path of the swivel 10. All other paths are similar. A central shaft 28 contains the production bores, one of which, 30 is illustrated here. A side exit 32 is provided. The fluid thus travels up bore 30 and exits via side bore 32 into the outer annular ring 26, where it passes into an annular cavity 34. From here, it exits via bore 36. The outer ring 26 is free to rotate around the central shaft 28. Because of the annular cavity 34, bores 32 and 36 do not have to be in line.

Figure 3:
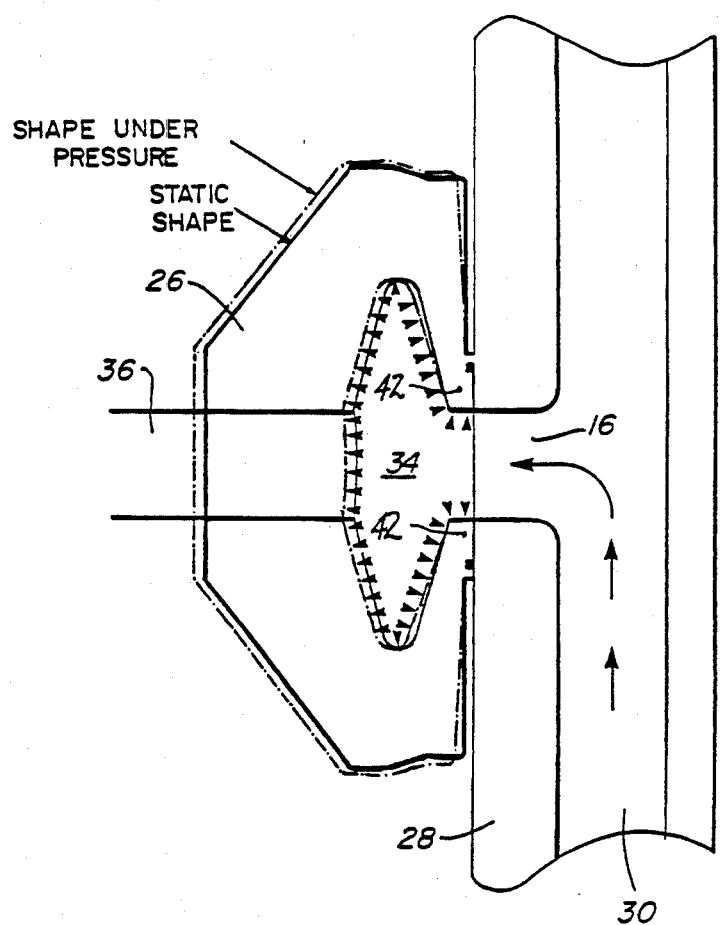
FIG. 3 schematically illustrates the deflection of the outer ring.
Figure 4:
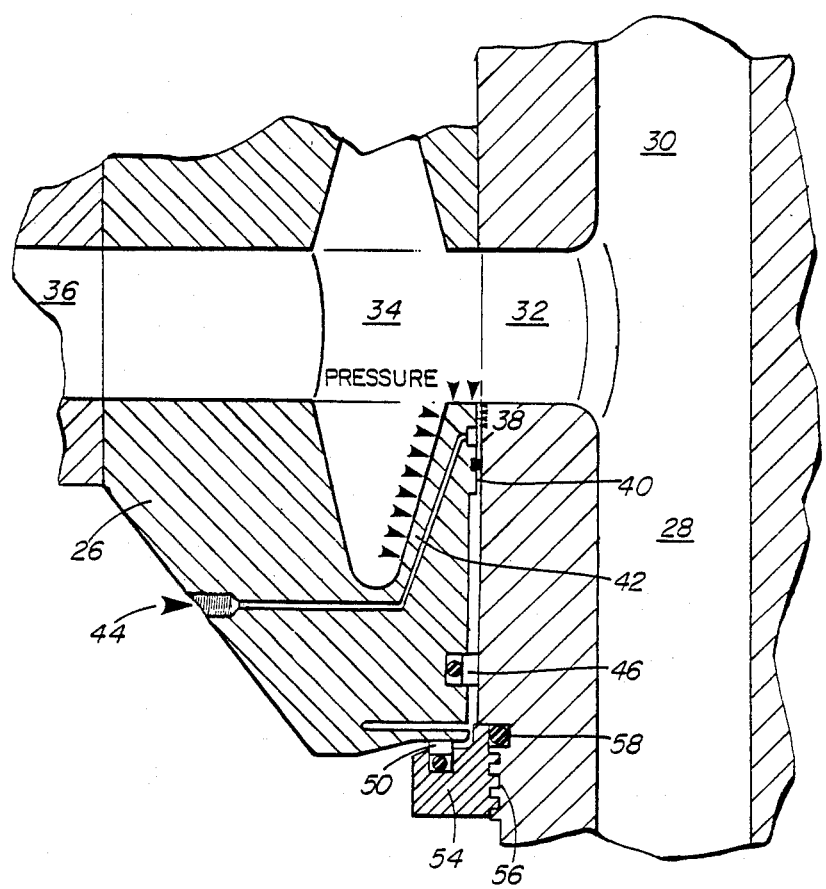
FIG. 4 is a cross-sectional view showing seal details.

The basic seals are provided at seal surfaces 38 and 40. When production fluid is in the annular cavity 34 and under pressure, the annular ring 26 will expand outwards, as illustrated in FIG. 3. But because the seals are at the end of the sealing lip 42, there is an unbalanced pressure force on the lip and it will deflect in the opposite direction to the outer ring as a whole. The unbalanced pressure forces are also illustrated in FIG. 4. Thus it can be seen that with the correct proportioning of the size of the outer ring 26 and the seal lip 42, the sealing surfaces can be prevented from moving and the seal gap can be maintained at a constant with increases in pressure.

Usually, it is necessary to have a positive seal gap to make assembly practical and to accommodate thermal expansion. With the flexibility provided by the seal lip 42, it is possible to reduce the seal gap to zero, or even to have interference. The amount of interference will determine the surface contact pressure and thus friction. The longer the seal lip 42, the more deflection is possible at the sealing surfaces 38 and 40 for a given change in surface contact pressure. With the seal gap reduced to practically zero, the seal elements can be made relatively small. If the seal surfaces are made extremely smoothly (i.e. polished), it is possible that seal elements may not be required. This will be discussed later.

The two seal surfaces 38 and 40 are shown in FIG. 2 with a pressure access line 44 that penetrates the sealing surfaces between the two surfaces. This is illustrated in FIG. 4. In this case, seal surface 38 is shown without any seal element (although it could have). The surfaces are ground and polished and will provide a high degree of sealing capabililty. Sealing surface 40 contains a small seal element, although its surface is also ground and polished. Seal surface 40 is longer than seal surface 38, to provide a longer seal path and thus more potential for sealing. A liquid is pumped through passage 44. This liquid has a viscosity such that it cannot normally pass through the sealing surfaces that are in contact, i.e. the surface imperfections on the sealing surfaces are such that the microscopic gaps will cause an extremely high pressure loss for the viscosity of the liquid. The liquid also acts as a lubricant. The pressure in passage 44 is kept higher than in cavity 34. Thus, if leakage occurs, the controlled fluid will leak into the hydrocarbon flow rather than hydrocarbons leaking out of the swivel. This provision also flushes the seal area of sand, etc., that could damage the surfaces. The use of the liquid between the seals also provides a sealing mechanism and lubrication when gas is the production fluid.

From the above description, it can be seen that it is possible to have no sealing elements at surfaces 38 and 40 or to have them at both places. If seal elements are used, then grinding and polishing will not be necessary. It is also possible to have the seal lip 42 function as described earlier for seal gap control, even if the pressure passage 44 were not used.

It was mentioned that it is possible that seal elements (such as elastomers, etc.) may not be necessary. Metal seals are commonly used in the oil industry for static seals. Metal seals are also used elsewhere; for example, piston rings in engines, and shear-type valves. Similarly, ceramics are used by themselves for moving seal applications. The main problem with using these materials is surface finish, tolerance control, and contact pressure. With ceramics, an additional problem is ensuring that they are loaded only in compression. It can be seen from the previous descriptions that with controlling the deflections the ceramic area could be kept at a constant dimension, or even put in compression if necessary.

In order for hard materials such as metals or ceramics to work, and for zero elastomer seal gaps, surface finish, ovality and contact pressures are critical. With surface finish, all the parts are cylindrical for which normal manufacturing methods will produce acceptable limits on waviness. Surface finish itself can be usually achieved at additional cost. Polishing of ceramics is a normal practice for this type of application. Furthermore, appropriate ceramics (such as aluminum oxide) are harder than sand and other particles, and will grind up the sand rather than the sand scratch the sealing surfaces. The use of a sealing liquid mentioned earlier will be of further aid.

With the sealing lip 42 tapering for structural reasons towards the tip where the sealing surfaces are, it means the tip can be relatively thin. Its thickness is thus considerably smaller than its diameter, allowing the overall shape to conform to the inner shaft.

Figure 5:
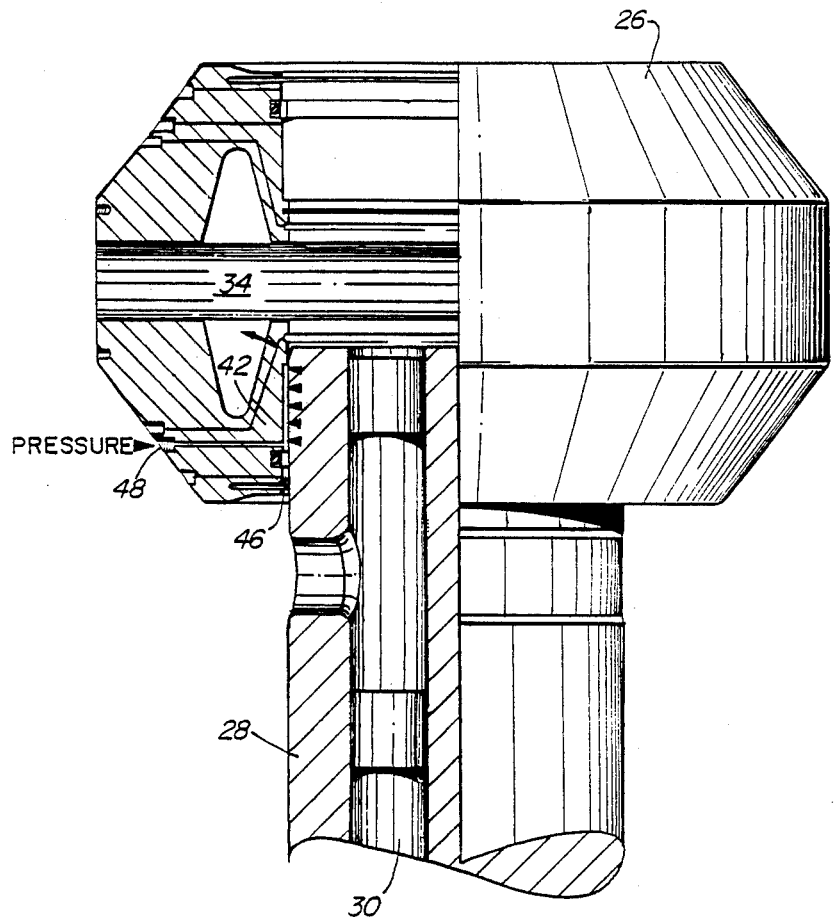
FIG. 5 illustrates the method of assembly.

When interference or zero clearance fits are used, assembly is usually a problem. FIG. 5 shows a method of assembly. If the diameter of the seal surface 40 is smaller than the diameter of the shaft 28, then an interference exists and assembly is probably impossible. But with seal 46, which is a normal lower pressure seal (described later), then the space between seals 40 and 46 can be pressurized, which will deflect sealing lip 42 away from the shaft 28 and the two components can be pushed together. The outside of the shaft at the location of the exit port is reduced in diameter so that no interference occurs. This overcomes the problem of maintaining a seal at the exit port when seal 40 passes over the port.

During operation of the swivel, it may be desirable to adjust the seal gap or the amount of interference contact pressure. This can be accomplished by pressurizing through passage 48 (FIG. 2) which will deflect the seal lip 42 away from the shaft 28. This is similar to the assembly method described above. Because relatively low pressures are used, seal 46 does not have to have the seal gap control technique used for the seals, especially since it is in a low stress area and can therefore have a large cross section.

With any high-pressure sealing device, it is prudent to have a backup sealing system. This is provided by seal 50. This is arranged similar to the seal technique described for seal surfaces 38 and 40, except the seal element is not contained in the lip. A lip 52 is provided and seal element 50 contacts the lip at the tip thereat. The seal element 50 is housed in a ring 54. Ring 54 also serves to position the annular outer ring 26 on the shaft 28. Ring 54 is shown with a threaded connection 56 to shaft 28. Other connection methods could also be used. Seal element 58 seals between ring 54 and shaft 28. If seals 38, 40 and 46 fail, the cavity between seals 46 and 50 will become pressurized and lip 52 will be forced against ring 54, providing a seal. Detection of pressure between seals 46 and 50 is provided by monitoring through passage 60, FIG. 2. Normally, there is no pressure and there is little friction caused by seal element 50. Thus during normal operation, seal 50 causes very little interference with normal performance of the swivel. When a failure occurs, seal 50 is automatically activated by the failure. Thus, this is a failsafe design. If this failure occurs and backup seal 50 is used, the outer ring 26, having a larger pressure area, wil expand outwards farther. This will not affect the operation of seal 50 which acts parallel to this movement. Depending on the amount of safety required, it is possible to have the force pushing lip 52 against ring 54 very high by changing the length and thickness of lip 52. In this case, rotation may not be possible; but in an emergency, this is probably either desirable or acceptable until the production flow can be shut off.

Figure 6:
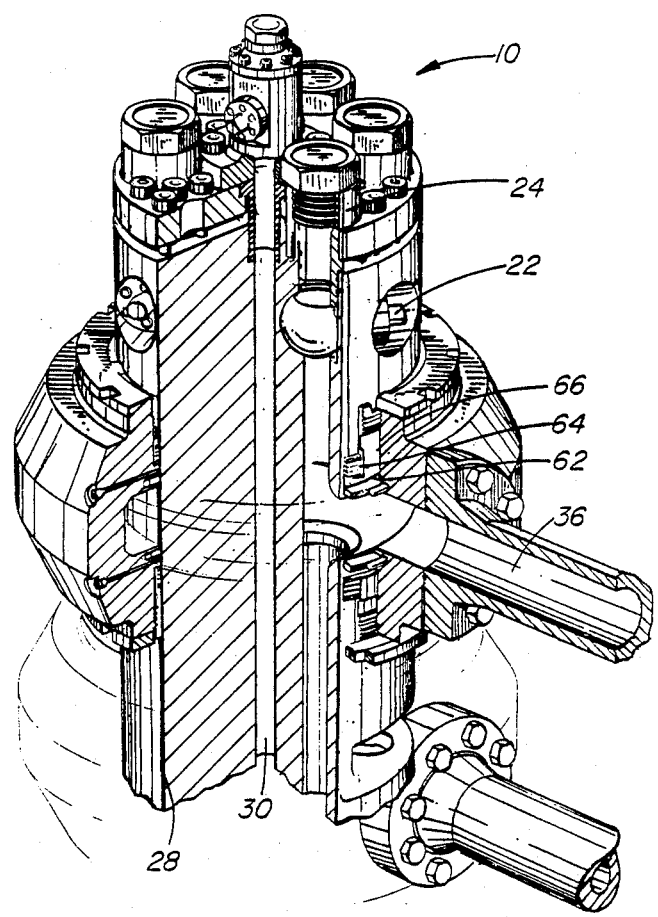
FIG. 6 is a perspective view of the multipass swivel.

FIG. 6 shows an alternative application of the above seal gap control technique. In this case, a conventional seal is used for the primary seal 62. No clearance control is provided for this seal. A secondary seal 64 is mounted on a lip arrangement 66, whereby pressure can get behind the lip as previously described and push the lip and seal against the shaft. Primary seal 62 is selected for its sealing and friction performance. Secondary seal 64 is selected for its reliability. A Chevron packing is shown. These are very reliable and can withstand high pressures, but also have very high friction characteristics. The arrangement shown in FIG. 6, with the secondary seal 64 mounted on the lip 66, mean that the seal contacts the shaft during normal operation but, since it is not under pressure, does not generate much friction. If the primary seal 62 fails, then the secondary seal provides enough initial seal to have the pressure force the lip 66 against the shaft. Thus the seal system is self-energizing—the higher the pressure, the more the seal.

While the invention has been described in connection with a specific embodiment thereof and in a specific use, various modifications thereof will occur to those skilled in the art without departing from the spirit and scope of the invention as set forth in the appeded claims.

The terms and expressions which have been employed in this specification are used as terms of description and not of limitation, and there is no intention in the use of such terms and expressions to exclude any equivalents of the features shown and described or portions thereof, but it is recognized that various modifications are possible within the scope of the invention claimed.

The embodiments of the invention in which an exclusive property or privilege is claimed are defined as follows:

1. In a multi-path multi-pass swivel, a fluid swivel assembly comprising a central cylindrical member having an exterior cylindrical surface, a central bore, an essentially radially outwardly opening exit port and an annular ring surrounding said cylindrical member; said annular ring having an annular groove adapted to register with said exit port, and an outlet port on the exterior of said annular ring; said annular ring communicating with said outlet port on the exterior of said annular ring; and cylindrical radially inner lip surfaces to each side of said groove and sealed against said exterior cylindrical surface of said cylindrical member by at least two axially spaced apart seals; and including means for introducing a fluid under pressure between said two seals at a higher pressure than fluid in the bore; said two seals being such that in such conditions, the fluid interconnected between the seals passes more easily across the seal to the annular groove than across the other of the two seals.

2. A fluid swivel according to claim 1, comprising a chamber surrounding said annular groove, said chamber being of axial dimensions substantially larger than the width of the groove; the wall thickness between the chamber and the inner cylindrical lip surfaces of the annular ring being sufficiently thin that increasing the pressure in the fluid within the chamber urges the lip surfaces of the groove more strongly against the outside of the central cylindrical member despite the overal expansion of the annular ring caused by the increase in pressure.

3. A fluid swivel according to claim 1, including a back-up seal in which low friction applies during normal use; and whereby, if primary seal failure occurs, the back-up seal deflects under pressure such that the higher the pressure, the higher the contact force between seal faces of the back-up seal.

4. In a multi-path multi-pass swivel, a fluid swivel assembly comprising a central cylindrical member having an exterior cylindrical surface, a central bore, an exit port opening essentially radially outwardly from said bore and an annular ring surrounding said cylindrical member; said annular ring having an annular groove adapted to register with said exit port and communicating with an outlet port on the exterior of said annular ring; said annular ring having cylindrical radially inner lip surfaces to each side of said groove and sealed against said exterior cylindrical surface of said cylindrical member by at least two axially spaced apart seals; a chamber surrounding said groove, said chamber being of axial dimensions substantially larger than the width of the groove; the wall thickness between said chamber and the inner cylindrical lip surfaces of the annular ring being sufficiently thin that increasing the pressure in the fluid within said chamber urges said lip surfaces of the groove more strongly against said exterior cylindrical surface of the central cylindrical member despite overall expansion of the annular ring caused by the increase in pressure in said chamber, and means for introducing a fluid under pressure between said two seals at a higher pressure than fluid in said bore, said two seals being such that, in such conditions, the fluid introduced between the seals passes more easily across the seal to the annular groove than across the other of the two seals.

5. A fluid swivel according to claim 7, including a back-up seal in which low friction applies during normal use; and whereby, if primary seal failure occurs, the back-up seal deflects under pressure such that the higher the pressure, the higher the contact force between seal faces of the back-up seal.

6. In a multi-path multi-pass swivel, a fluid swivel assembly comprising a central cylindrical member having an exterior cylindrical surface, a central bore, an exit port essentially radially outwardly from said bore and an annular ring surrounding said cylindrical member; said annular ring having an annular groove adapted to register with said exit port, and communicating with an outlet port on the exterior of said annular ring; said annular ring having cylindrical radially inner lip surfaces to each side of said groove and sealed against said exterior cylindrical surface of said cylindrical member by at least two axially spaced apart seals; a chamber surrounding said groove, said chamber being of axial dimensions substantially larger than the width of the groove; the wall thickness between said chamber and the inner cylindrical lip surfaces of the annular ring being sufficiently thin that increasing the pressure in the fluid within said chamber urges said lip surfaces of the groove more strongly against said exterior cylindrical surface of the central cylindrical member despite overall expansion of the annular ring caused by the increase in pressure in said chamber; and a back-up sealing system comprising seal rings located on said central cylindrical member, one on each side of said annular ring, a second peripheral lip member on each side of said annular ring said peripheral lips being positioned for movement toward seal rings; and seal means in said seal rings engaging said second peripheral lip members.

7. In a multi-path multi-pass swivel, a fluid swivel assembly comprising a central cylindrical member having an exterior cylindrical surface, a plurality of central bores, an exit port opening essentially radially outwardly from each of said bores and a plurality of annular swivel rings mounted on and surrounding said cylindrical member; each said annular swivel ring having an annular groove registering with the exit port of one of said central bores and communicating with an associated outlet port on the exterior of said annular ring; each said annular swivel ring having a pair of spaced, cylindrical radially inner lip surfaces, one on each side of said groove, a seal member in each of said lip surfaces to seal said lip surfaces against said exterior cylindrical surface of said cylindrical member, each said annular swivel ring including a peripheral chamber portion extending to either side of said groove and thereby having axial dimensions substantially greater than the width of said groove; the wall thickness of each said annular swivel ring between said chamber portion and the inner cylindrical lip surfaces being of such dimension that, when the pressure of the fluid within said chamber portion increases, said lip surfaces of said annular ring are urged more strongly against said exterior cylindrical surface of the central cylindrical member despite overall expansion of the annular ring.

8. In a multi-path multi-pass swivel, a fluid swivel assembly comprising a central cylindrical member having an exterior cylindrical surface, a plurality of central bores, an exit port opening essentially radially outwardly from each of said bores and a plurality of annular swivel rings mounted on and surrounding said cylindrical member;

each said annular swivel ring having an annular groove registering with the exit port of one of said central bores and communicating with an associated outlet port on the exterior of said annular ring;

each said annular swivel ring having a pair of spaced, cylindrical radially inner lip surface, one on each side of said groove and journalled on said exterior cylindrical surface, a seal member in one of said lip surfaces to seal that lip surface against said exterior cylindrical surface of said cylindrical member, each said annular swivel ring including a peripheral chamber portion extending to either side of said groove and thereby having axial dimensions substantially greater than the width of said groove;

the wall thickness of each said annular swivel ring between said chamber portion and the inner cylindrical lip surfaces being of such dimension that, when the pressure of the fluid within said chamber portion increases, said lip surfaces of said annular ring are urged more strongly against said exterior cylindrical surface of the central cylindrical member despite overall expansion of the annular ring; and means for introducing a fluid under pressure between said one of said lip surfaces and said exterior cylindrical surface and intermediate said seal member and said groove, said injected fluid being at a higher pressure than fluid in said bore.

9. In a multi-path multi-pass swivel according to claim 8, wherein said one of said lip surfaces has at least two axially spaced apart seals whereby introducing said fluid under pressure between said two seals of said one lip portion at a higher pressure than fluid in the bore will cause said fluid introduced between the seals to pass more easily across the seal located adjacent the groove to said annular grovoe than across the other of the two seals.

10. In a multi-path multi-pass swivel according to claim 9, and further comprising a back-up sealing system including seal rings located on said central cylindrical member, one on each side of said annular ring, a second peripheral lip member on each side of said annular ring said peripheral lips being positioned for movement toward seal rings; and seal means in said seal rings engaging said second peripheral lip members.

11. In a multi-path multi-pass swivel, a fluid swivel assembly comprising a central cylindrical member having an exterior cylindrical surface, a plurality of central bores, an exit port opening essentially radially outwardly from each of said bores and a plurality of annular swivel rings mounted on and surrounding said cylindrical member; each said annular swivel ring having an annular groove registering with the exit port of one of said central bores and communicating with an associated outlet port on the exterior of said annular ring; each said annular swivel ring having a pair of spaced, cylindrical radially inner lip surfaces, one on each side of said groove, said lip surfaces sealing against said exterior cylindrical surface of said cylindrical member, each said annular swivel ring including a peripheral chamber portion extending to either side of said groove and thereby having axial dimensions substantially greater than the width of said groove; the wall thickness of each said annular swivel ring between said chamber portion and the inner cylindrical lip surfaces being of such dimension that, when the pressure of the fluid within said chamber portion increases, said lip surfaces of said annular ring are urged more strongly against said exterior cylindrical surface of the central cylindrical member despite overall expansion of the annular ring;

a peripheral seal in said swivel ring located remotely from said lip surface; and means for introducing a fluid under pressure between the inner surface of said swivel ring and the exterior surface of said cylindrical member and intermediate said sealing lip surface and said remote seal whereby said sealing lip can be deflected radially outwardly of the cylindrical member to facilitate assembly of said swivel thereon.

12. A multi-path, multi-pass swivel accordingly to claim 11 including a further peripheral seal between said lip surface and said cylindrical member.

13. A multi-path, multi-pass swivel according to claim 11 wherein the outer peripheral surface of said cylindrical member adjacent said outlet is chamfered to reduce its diameter so that no interference occurs between it and said lip surface of said swivel ring.

* * * * *